(12) United States Patent
Lu et al.

(10) Patent No.: US 10,712,461 B2
(45) Date of Patent: Jul. 14, 2020

(54) PRESTACK SEPARATING METHOD FOR SEISMIC WAVE

(71) Applicant: China University of Geosciences (Beijing), Beijing (CN)

(72) Inventors: Jun Lu, Beijing (CN); Yun Wang, Beijing (CN)

(73) Assignee: CHINA UNIVERSITY OF GEOSCIENCES (BEIJING), Beijing (CN)

( * ) Notice: Subject to any disclaimer, the term of this patent is extended or adjusted under 35 U.S.C. 154(b) by 497 days.

(21) Appl. No.: 15/347,411

(22) Filed: Nov. 9, 2016

(65) Prior Publication Data
US 2017/0131420 A1    May 11, 2017

(30) Foreign Application Priority Data
Nov. 9, 2015  (CN) .......................... 2015 1 0757298

(51) Int. Cl.
*G01V 1/36* (2006.01)
*G01V 1/32* (2006.01)

(52) U.S. Cl.
CPC ................ *G01V 1/362* (2013.01); *G01V 1/32* (2013.01); *G01V 2210/512* (2013.01)

(58) Field of Classification Search
None
See application file for complete search history.

(56) References Cited

U.S. PATENT DOCUMENTS

| 5,027,332 A | * | 6/1991 | Alford | G01V 1/003 367/31 |
| 5,060,203 A | * | 10/1991 | Winterstein | G01V 1/284 367/31 |
| 5,060,204 A | * | 10/1991 | Winterstein | G01V 1/284 367/31 |
| 5,136,554 A | * | 8/1992 | Thomsen | G01V 1/005 367/31 |

(Continued)

FOREIGN PATENT DOCUMENTS

| CN | 102520443 A | 6/2012 |
| CN | 102893183 A | 1/2013 |

(Continued)

*Primary Examiner* — Lina M Cordero
(74) *Attorney, Agent, or Firm* — NZ Carr Law Office

(57) ABSTRACT

The present disclosure provides a prestack separating method for a seismic wave, including: receiving P-wave, S1-wave and S2-wave of the seismic wave, wherein the P-wave, S1-wave and S2-wave are reflected from different points; projecting the P-wave, S1-wave and S2-wave into a Z-R-T coordinate system, so as to generate a projection matrix, wherein Z is a vertical component, R is a component of a source-to-receiver azimuth and T is a component orthogonal to the R component; forming vectors of the P-wave, S1-wave and S2-wave as a composite vector; transforming the composite vector to an anisotropic wave vector matrix according to base vectors on the vector directions of the P-wave, S1-wave and S2-wave; and performing a rotation transformation of an affine coordinate system on the anisotropic wave vector matrix to generate a wave separation matrix, thereby solving a problem of error prediction result of fracture parameters caused by the "mode leakage" phenomenon.

1 Claim, 17 Drawing Sheets

(56) References Cited

U.S. PATENT DOCUMENTS

| | | | | |
|---|---|---|---|---|
| 5,142,501 A * | 8/1992 | Winterstein | ............ | G01V 1/284 367/75 |
| 5,343,441 A * | 8/1994 | Alford | .................. | G01V 1/003 367/75 |
| 5,610,875 A * | 3/1997 | Gaiser | .................... | G01V 1/286 367/75 |
| 5,677,893 A * | 10/1997 | de Hoop | .............. | G01V 1/28 367/50 |
| 6,625,542 B1 * | 9/2003 | Hardage | ................ | G01V 1/053 367/75 |
| 6,826,485 B1 * | 11/2004 | Bale | ......................... | G01V 1/04 702/14 |
| 7,164,619 B2 * | 1/2007 | Robertsson | ............ | G01V 1/286 367/21 |
| 7,627,431 B2 * | 12/2009 | Angerer | ................ | G01V 1/364 702/14 |
| 8,120,991 B2 * | 2/2012 | Koren | ...................... | G01V 1/32 367/72 |
| 8,729,903 B2 * | 5/2014 | Srnka | ..................... | G01V 11/00 324/337 |
| 2007/0280048 A1 * | 12/2007 | Dubinsky | ................ | G01V 1/50 367/31 |
| 2008/0137478 A1 * | 6/2008 | Sollner | .................. | G01V 1/305 367/51 |
| 2010/0274489 A1 * | 10/2010 | Horne | ...................... | G01V 1/40 702/11 |
| 2010/0312534 A1 * | 12/2010 | Xu | .......................... | G01V 1/50 703/2 |
| 2012/0002505 A1 * | 1/2012 | Wang | ..................... | G01V 1/286 367/75 |
| 2012/0218861 A1 * | 8/2012 | Xia | ......................... | G01V 1/303 367/73 |
| 2015/0235081 A1 * | 8/2015 | Jiang | ................. | G06K 9/00476 382/109 |

FOREIGN PATENT DOCUMENTS

| | | |
|---|---|---|
| CN | 103635831 A | 3/2014 |
| CN | 104570110 A | 4/2015 |
| EP | 0400775 A2 | 2/1990 |

* cited by examiner

PRESTACK SEPARATING METHOD FOR SEISMIC WAVE

CROSS REFERENCE TO RELATED APPLICATION

This application is based upon Chinese Patent Application No. 201510757298.5, titled "PRESTACK SEPARATING METHOD FOR SEISMIC WAVE," filed Nov. 9, 2015, the entire contents of which are incorporated herein by reference.

BACKGROUND

Technical Field

The present disclosure is related to seismic exploration technical field, and more particular to a prestack separating method for a seismic wave.

Related Art

In the three-dimensional (3-D) three-component (3-C) seismic exploration, a vertical component (Z component) and two horizontal (X and Y) components acquire seismic signals simultaneously. According to the traditional three-component seismic data processing flow, 3-D 3-C seismic wave processing flow should start with a RT rotation, which transforms the seismic signals from the Z-X-Y coordinate system into the Z-R-T coordinate system, wherein R-component points to the direction of the source point to the detection point, and T-component is orthogonal to the directed pointed by R-component. Under the assumption that the subsurface is isotropic, flat-layered and of low-velocity, S wave mode can be considered to be received by R-component after the horizontal rotation, while T-component only receives noises and Z-component only receives noises and P-waves. However, the assumption is not acceptable in most of the 3-C seismic explorations.

For the effect of tectonic stress, high angle fractures often develop in the strata, which take on azimuth anisotropy. The azimuth anisotropy would cause S-wave to split into the fast (S1) and slow (S2) modes, which propagate with different vector attributes. S1-wave and S2-wave propagates with the polarization direction parallel and vertical to the fracture plane, respectively. It is usually considered that S1-waves and S2-waves interfere together to be a complex S mode, which is acquired simultaneously by X-component and Y-component, while P mode is acquired by Z-component. After the RT rotation, S modes in X-component and Y-component are transformed into R-component and T-component, which are called SV-wave and SH-wave.

SV-wave and SH-wave are respectively offset-imaged in the subsequent processing. In the traditional surface processing of the 3-C seismic data, S1-wave and S2-wave are separated from stacked SV-section and SH-section and predict fracture parameters. Such processing scheme of the 3-C seismic data is acceptable only when the surface wave velocities are low enough to make the seismic rays vertical to the surface nearly. However, in a wide variety of circumstances, tilted stratum ubiquitously existing in spatial or azimuthal variations of rock properties often make P mode and split S modes from different depth interfere together and project onto all the three components, which is known as the phenomenon of "mode leakage'. So the only of use the S mode in the horizon component to predict fracture parameters is not amplitude preserving, and will come to the result of great errors.

SUMMARY

The disclosure provides a prestack separating method for a seismic wave to solve the error problem of the prediction result of the fracture parameters caused by the "mode leakage" phenomenon.

An embodiment of the present disclosure provides a prestack separating method for a seismic wave, which includes: receiving P-wave, S1-wave and S2-wave of the seismic wave, wherein the P-wave, S1-wave and S2-wave are reflected from different points; projecting the P-wave, S1-wave and S2-wave into a Z-R-T coordinate system, so as to generate a projection matrix, wherein Z is a vertical component, R is a component of a source-to-receiver azimuth and T is a component orthogonal to the R component; forming vectors of the P-wave, S1-wave and S2-wave as a composite vector; transforming the composite vector to an anisotropic wave vector matrix according to base vectors on the vector directions of the P-wave, S1-wave and S2-wave; and performing a rotation transformation of an affine coordinate system on the anisotropic wave vector matrix to generate a wave separation matrix.

According to a technical solution of the present disclosure, by way of assuming no orthogonal polarization on the anisotropic wavefield, the seismic waves projected on Z-component, R-component and T-component of Z-R-T coordinate system are transformed to the true wave vector directions of pure P-wave, S1-wave and S2-wave, so as to facilitate the subsequent true amplitude imaging and inversion, thereby solving a problem of the error of the prediction result of the fracture parameters caused by the "mode leakage" phenomenon.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which:

FIG. 5(a) to FIG. 5(f) are schematic views of P-wave, S1-wave and S2-wave separation in an affine coordinate system respectively, wherein FIG. 5(a) shows synthetic pure P-wave, S1-wave and S2-wave, FIG. 5(b) shows the synthetic records of Z-component, R-component and T-component, FIG. 5(c) shows the synthetic records of Z-component, R-component and T-component at 10% noise level, FIG. 5(d) shows the records of separated P-wave, S1-wave and S2-wave in the affine coordinate system at 10% noise level, FIG. 5(e) shows the synthetic records of Z-component, R-component and T-component at 50% noise level, and FIG.

Figure 10A:
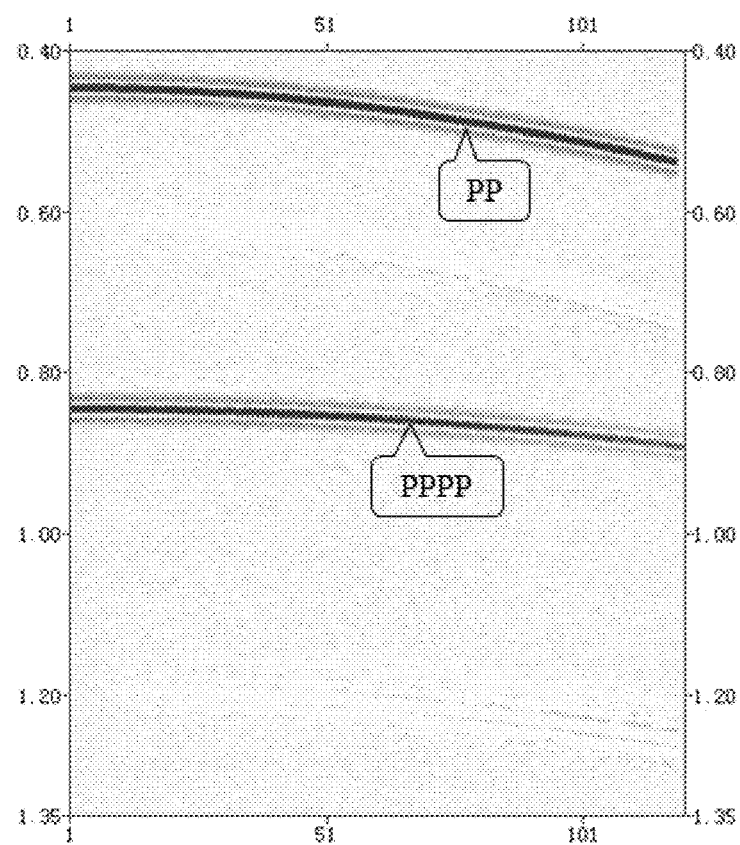

5 (*f*) shows the records of separated P-wave, S1-wave and S2-wave in the affine coordinate system at 50% noise level;

FIG. 6(*a*) to FIG. 6(*c*) are schematic views of particle trajectory curve at different noise levels, wherein FIG. 6(*a*) is at 0 noise level, FIG. 6(*b*) is at 10% noise level, and FIG. 6(*c*) is at 50% noise level;

FIG. 7(*a*) is a schematic view of calculation angles between P-wave, the positive Z-axis, R-axis and T-axis at different noise level, wherein the true angles between P-wave vector and the positive Z-axis, R-axis and T-axis are 10°, 84° and 82°, separately;

FIG. 7(*b*) is a schematic view of calculation angles between S1-wave, the positive Z-axis, R-axis and T-axis at different noise level, wherein the true angles between S1-wave vector and the positive Z-axis, R-axis and T-axis are 110°, 140° and 57°, separately;

FIG. 7(*c*) is a schematic view of calculation angles between S2-wave, the positive Z-axis, R-axis and T-axis at different noise level, wherein the true angles between S2-wave vector and the positive Z-axis, R-axis and T-axis are 85°, 55° and 35°, separately;

FIG. 8(*a*) is a ray traced diagram of P wave for the modeling;

FIG. 8(*b*) is a ray traced diagram of split S wave for the modeling;

FIG. 9(*a*) is a schematic view of Z-component fracture model data with 40% level noises;

FIG. 9(*b*) is a schematic view of R-component fracture model data with 40% level noises;

FIG. 9(*c*) is a schematic view of T-component fracture model data with 40% level noises;

FIG. 10(*a*) is a schematic view of P-wave after wave separation in the affine coordinate;

FIG. 10(*b*) is a schematic view of S1-wave after wave separation in the affine coordinate; and FIG. 10(*c*) is a schematic view of S2-wave after wave separation in the affine coordinate.

DETAILED DESCRIPTION

The main idea of the present disclosure is that the seismic waves projected on Z-component, R-component and T-component of Z-R-T coordinate system are transformed to the true wave vector directions of pure P-wave, S1-wave and S2-wave, so as to facilitate the subsequent true amplitude imaging and inversion, thereby solving a problem of the error of the prediction result of the fracture parameters caused by the "mode leakage" phenomenon.

In order to make the objects, technical solutions and advantages of the present disclosure more apparent, the present disclosure is further be described in details with reference to the accompanying drawings and specific examples.

Figure 1:
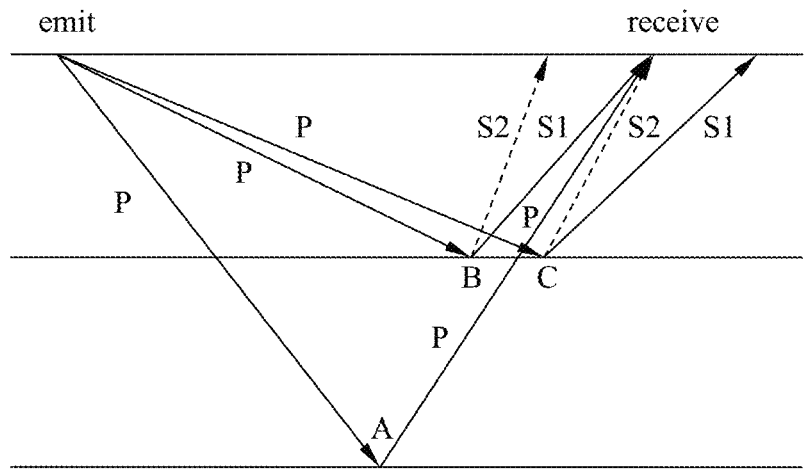
FIG. 1 is a schematic view of a seismic wave field received by a 3-C receiver at the surface at some certain time window according to an embodiment of the present disclosure.

Firstly, FIG. 1 is a schematic view of a seismic wave field received by a 3-C receiver at the surface at some certain time window according to an embodiment of the present disclosure. As shown in FIG. 1, the 3-C receiver at the surface may receive P-wave, S1-wave and S2-wave simultaneously at some certain time window. Because of the fast propagation velocity of P-wave, the P-wave received in the same time window may be reflected from point A at the deeper interface, and S1-wave and S2-wave received by the receiver will reflected from different point B and C at the same interface. The velocity difference between S1-wave and S2-wave determines the distance between point B and C. Since the distance between point B and C can be considered to be close enough, assuming that the fracture parameters of the position of two points are similar, the angle between of the vector projection of the S1-wave and S2-wave is close to 90° within R-T plane. However, in the 3-D space, the vector directions of the S1-wave and S2-waves are not orthogonal. Since the P-wave vector received in the same time window may reflected from point at the deeper interface, any of the vector direction of P-wave, S1-wave and S2-wave is not orthogonal to the other at the same certain time window. Based on that, the rotation transformation of the non-orthogonal affine coordinate is necessarily used to achieve the separation of the vector wave field.

Figure 2:
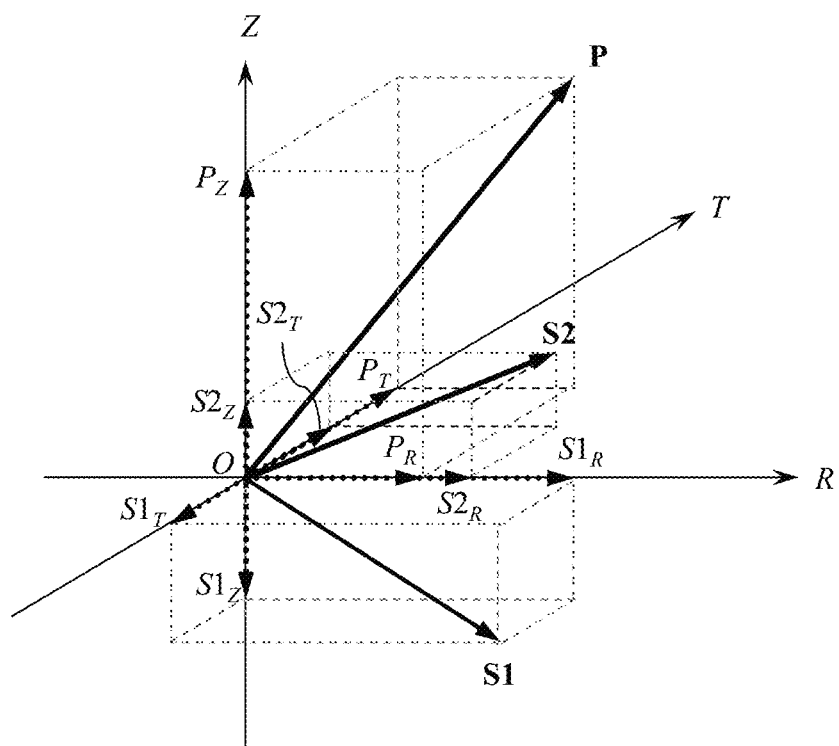
FIG. 2 is schematic view of vectors of P-wave, S1-wave and S2-wave on Z-R-T coordinate system according to an embodiment of the present disclosure.

When the fracture exists in the underground medium, as shown in FIG. 2, the 3-D receiver at the surface may receive P-wave, S1-wave and S2-wave reflected from different points, all the projections may appear on the 3-D receiver at the surface and project to the Z-R-T coordinate system, as shown in equation (1):

$$\begin{bmatrix} P \\ S1 \\ S2 \end{bmatrix} = \begin{bmatrix} P_Z & P_R & P_T \\ S1_Z & S1_R & S1_T \\ S2_Z & S2_R & S2_T \end{bmatrix} \begin{bmatrix} e_Z \\ e_R \\ e_T \end{bmatrix}, \quad (1)$$

wherein P, S1 and S2 are vectors of the P-wave, S1-wave and S2-wave respectively, $e_Z$, $e_R$ and $e_T$ are base vectors of Z, R and T directions respectively, $P_Z$, $S1_Z$, $S2_Z$ are amplitudes of the P-wave, S1-wave and S2-wave on a Z-coordinate respectively, $P_R$, $S1_R$, $S2_R$ are amplitudes of the P-wave, S1-wave and S2-wave on a R-coordinate respectively, and $P_T$, $S1_T$, $S2_T$ are amplitudes of the P-wave, S1-wave and S2-wave on a T-coordinate respectively.

The vectors of the P-wave, S1-wave and S2-wave are formed as a composite vector A, as shown in equation (2):

$$A = Z + R + T, \quad (2)$$

wherein A is the composite vector, Z is a vector of the composite vector in a Z direction, R is a vector of the composite vector in an R direction, and T is a vector of the composite vector in a T direction. Z, R and T is amplitude components received by the Z-component, R-component and T-component of 3-C receiver at the surface, as shown in equation (3):

$$\begin{cases} Z = (P_Z + S1_Z + S2_Z)e_Z \\ R = (P_R + S1_R + S2_R)e_R, \\ T = (P_T + S1_T + S2_T)e_T \end{cases} \quad (3)$$

wherein $e_Z$, $e_R$ and $e_T$ are base vectors of Z, R and T directions respectively, $P_Z$, $S1_Z$, $S2_Z$ are amplitudes of the P-wave, S1-wave and S2-wave on a Z-coordinate respectively, $P_R$, $S1_R$, $S2_R$ are amplitudes of the P-wave, S1-wave and S2-wave on a R-coordinate respectively, and $P_T$, $S1_T$, $S2_T$ are amplitudes of the P-wave, S1-wave and S2-wave on a T-coordinate respectively.

Using $e_P$, $e_{S1}$ and $e_{S2}$ to denote the base vectors in the P-direction, S1-direction and S2-direction, and according to the base vectors in vector directions of the P-wave, S1-wave and S2-wave, the composite vector A is transformed to an anisotropic wave vector matrix, as shown in equation (4):

$$\begin{bmatrix} Z \\ R \\ T \end{bmatrix} = \begin{bmatrix} \cos(e_P, e_Z) & \cos(e_{S1}, e_Z) & \cos(e_{S2}, e_Z) \\ \cos(e_P, e_R) & \cos(e_{S1}, e_R) & \cos(e_{S2}, e_R) \\ \cos(e_P, e_T) & \cos(e_{S1}, e_T) & \cos(e_{S2}, e_T) \end{bmatrix} \begin{bmatrix} P \\ S1 \\ S2 \end{bmatrix}, \quad (4)$$

wherein Z is a vector of Z direction, R is a vector of R direction, T is a vector of T direction, P, S1 and S2 are vectors of the P-wave, S1-wave and S2-wave respectively, $\cos(e_P, e_Z)$ is the cosine of the angle between P-wave base vector and Z-wave base vector, $\cos(e_P, e_R)$ is the cosine of the angle between P-wave base vector and R-wave base vector, $\cos(e_P, e_T)$ is the cosine of the angle between P-wave base vector and T-wave base vector, $\cos(e_{S1}, e_Z)$ is the cosine of the angle between S1-wave base vector and Z direction base vector, $\cos(e_{S1}, e_R)$ is the cosine of the angle between S1-wave base vector and R direction base vector, $\cos(e_{S1}, e_T)$ is the cosine of the angle between S1-wave base vector and T direction base vector, $\cos(e_{S2}, e_Z)$ is the cosine of the angle between S2-wave base vector and Z direction base vector, $\cos(e_{S2}, e_R)$ is the cosine of the angle between S2-wave base vector and R direction base vector, and $\cos(e_{S2}, e_T)$ is the cosine of the angle between S2-wave base vector and T direction base vector.

It can be seen from the equation (4) that the amplitude components received by Z-component, R-component and T-component is a mixture of the anisotropic wave field, such that the vectors of P, S1 and S2 of the anisotropic wave are leaked to the all the three components (Z, R and T), which is called mode leakage. Therefore, in order to suppress the above mode leakage, it needs to perform a rotation transformation of an affine coordinate system on the anisotropic wave vector matrix, so as to generate a wave separation matrix, as shown in equation (5):

$$\begin{bmatrix} P \\ S1 \\ S2 \end{bmatrix} = \begin{bmatrix} \cos(e_P, e_Z) & \cos(e_{S1}, e_Z) & \cos(e_{S2}, e_Z) \\ \cos(e_P, e_R) & \cos(e_{S1}, e_R) & \cos(e_{S2}, e_R) \\ \cos(e_P, e_T) & \cos(e_{S1}, e_T) & \cos(e_{S2}, e_T) \end{bmatrix}^{-1} \begin{bmatrix} Z \\ R \\ T \end{bmatrix}, \quad (5)$$

It can be seen from the equation (5) that solving the base vector $e_P$, $e_{S1}$ and $e_{S2}$, i.e. determining the angle between the coordinate axis of the coordinate system (determining the wave vector direction) is a key for constructing the vector wave field separation having the fracture medium, and the pure P-wave, S1-wave and S2-wave are further obtained, so as to facilitate the subsequent true amplitude imaging and inversion.

In the foregoing, the related equations required to be applied of the embodiments of the present disclosure are roughly described, and the corresponding embodiment are provided to describe as follows. According to an embodiment of the present disclosure, a prestack separating method for a seismic wave is provided.

Figure 3:
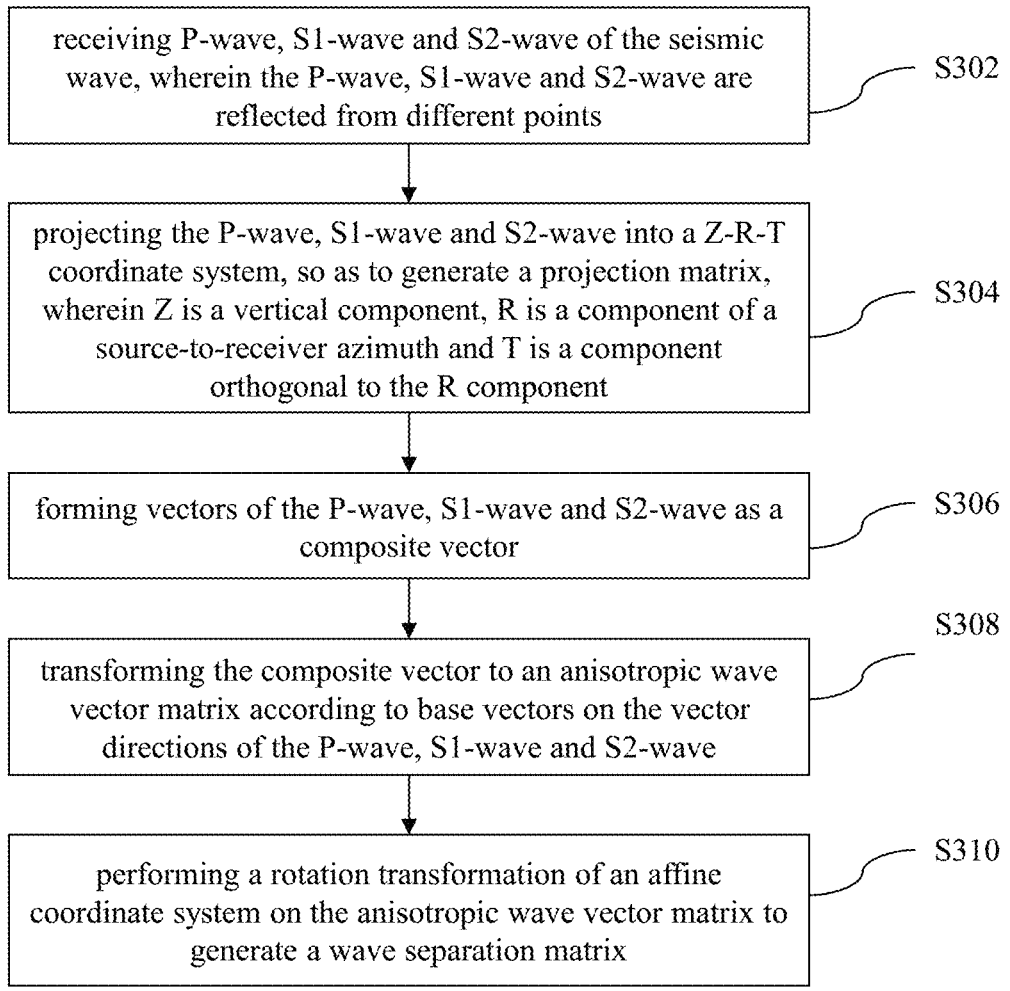
FIG. 3 is a flowchart of a prestack separating method for a seismic wave according to an embodiment of the present disclosure.

FIG. 3 is a flowchart of a prestack separating method for a seismic wave according to an embodiment of the present disclosure.

Step S302: receiving P-wave, S1-wave and S2-wave of the seismic wave, wherein the P-wave, S1-wave and S2-wave are reflected from different points.

Step S304: projecting the P-wave, S1-wave and S2-wave into a Z-R-T coordinate system, so as to generate a projection matrix, wherein Z is a vertical component, R is a component of a source-to-receiver azimuth and T is a component orthogonal to the R component. The projection matrix is shown in the equation (1).

Step S306: forming vectors of the P-wave, S1-wave and S2-wave as a composite vector. Wherein the composite vector is as shown in the equation (2) and (3).

Step S308: transforming the composite vector to an anisotropic wave vector matrix according to base vectors on the vector directions of the P-wave, S1-wave and S2-wave. Wherein the anisotropic wave vector matrix is shown in the equation (4).

Step S310: performing a rotation transformation of an affine coordinate system on the anisotropic wave vector matrix to generate a wave separation matrix. Wherein the wave separation matrix is shown in the equation (5).

Hereinafter, a wave vector composition method is further provided to directly solve the wave vector direction, the basic assumption of the method is that the angle between polarization direction of P-wave and Z-axis is less than 45° and the angle between polarization direction of S-wave (including S1-wave and S2-wave) and Z-axis is greater than 45°.

Figure 4:
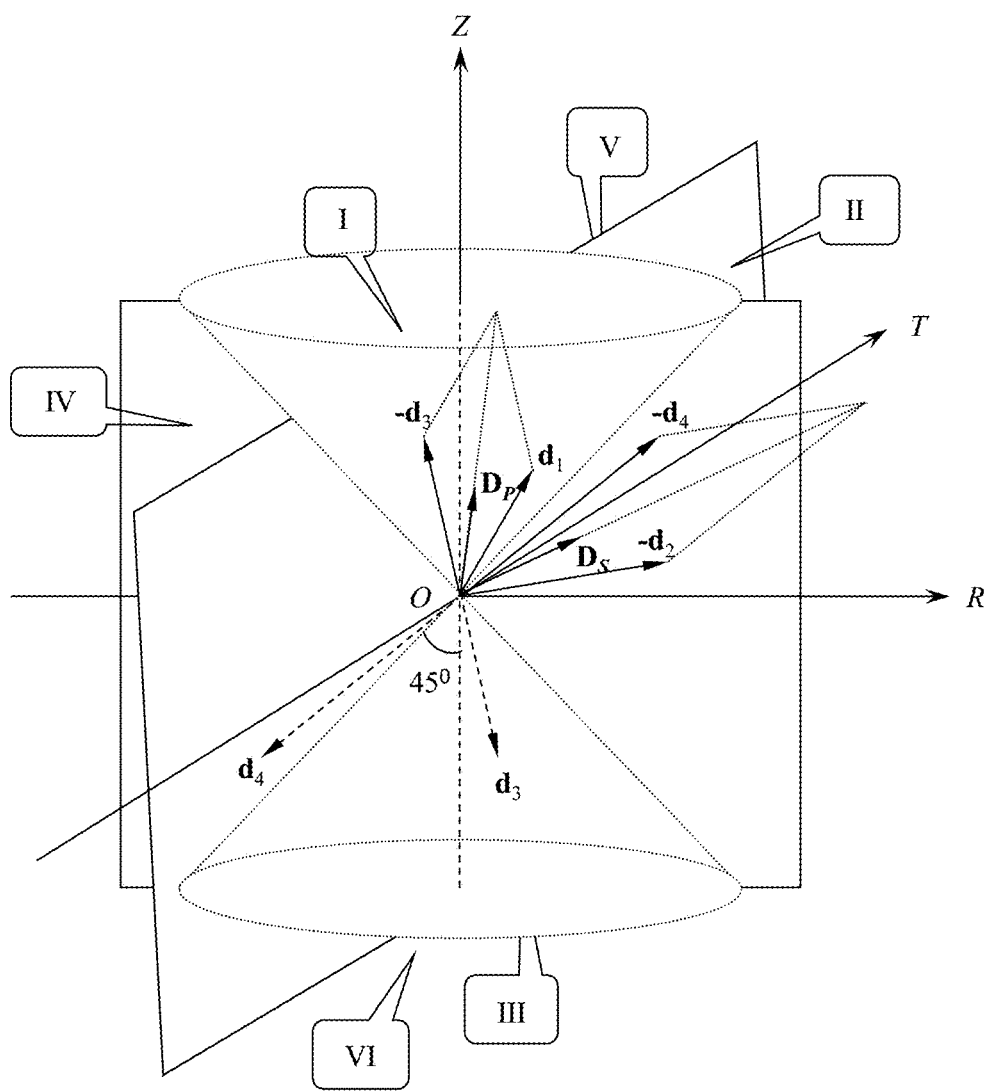
FIG. 4 is a schematic view of a wave vector composition according to an embodiment of the present disclosure.

FIG. 4 is a schematic view of a wave vector composition according to an embodiment of the present disclosure. As shown in FIG. 4, the space of Z-R-T coordinate system is divided into the subspaces I, II, III, IV, V and VI. The subspaces I and III surrounded by two conical surfaces with the vertexes at the point O and the infinite lengths along with the positive direction and negative direction of Z-axis, separately. The angles between the conical generatrices of the outside surfaces of the subspace I and the positive direction of Z-axis are 45°, and which is same to the angle between the conical generatrices of the outside surfaces of the subspace III and the negative direction of Z-axis. The subspace II is surrounded by the half plane composed of Z-axis and the positive direction of R-axis, the half plane composed of Z-axis and the positive direction of T-axis and the outside surfaces of subspace I and III. The subspace IV is surrounded by the half plane composed of Z-axis and the negative direction of R-axis, the half plane composed of Z-axis and the negative direction of T-axis and the outside surfaces of subspace I and III. The subspace V is surrounded by the half plane composed of Z-axis and the negative direction of R-axis, the half plane composed of Z-axis and the positive direction of T-axis and the outside surfaces of subspace I and III. The subspace VI is surrounded by the half plane composed of Z-axis and the positive direction of R-axis, the half plane composed of Z-axis and the negative direction of T-axis and the outside surfaces of subspace I and III. In the subspace I and II, the angles between the polarization directions of seismic waves and the positive or the negative direction of Z-axis are less than or equal to 45°. And such wave modes are P-waves, mainly.

In the subspace I, the entire wave vectors with an angle less than 45° from the positive direction of Z-axis are composed to get vector $d_1$, and in the subspace III, the entire wave vectors with an angle less than 45° from the negative direction of Z-axis are composed to get vector $d_2$. Then, a base vector $e_P$ of P-wave is derived through equation (6) and the equation (6) is as follows.

$$e_P = \frac{d_1 - d_2}{|d_1 - d_2|}, \quad (6)$$

Outside the subspace I and II, the angle between the vector direction of the seismic wave and the positive direction of Z-axis or the negative direction of Z-axis exceeds 45°, it is more close to the vibration of S-wave mode, which involves S1-wave and S2-wave modes simultaneously, and it needs to separate. From the analysis of FIG. 1, S1-wave and S2-wave can be considered from two closed reflection points. So the projection vectors on the R-T plane of S1-wave and S2-wave are orthogonal and locate in the different diagonal quadrants. The wave vectors in the subspace II and IV and in the V and VI are composed to get the base vectors of the S1-wave and S2-wave respectively, Taking the subspace II and IV as an example, the entire wave vectors in subspace II are composed to get vector $d_2$, and the entire wave vectors in subspace IV are composed to get vector $d_4$, and the base vector $e_S$ of the S-wave is derived through equation (7), and the equation (7) is as follows:

$$e_S = \frac{d_2 - d_4}{|d_2 - d_2|}. \quad (7)$$

In the same way, in the subspace V and VI, another base vector $e_S'$ of S-wave is gotten through the wave vector composition, as shown in equation (8):

$$e_S' = \frac{d_5 - d_6}{|d_5 - d_6|}. \quad (8)$$

Since the travel time of S1-wave is less than that of S2-wave, during the vector computation of S-wave, the positions of the time window of the seismic wave data corresponding to $d_1$, $d_2$, $d_3$, $d_4$ are counted, so as to match the base vectors $e_S$ and $e_S'$ to the base vectors $e_{S1}$ and $e_{S2}$ of S1-wave and S2-wave respectively. The base wave vector $e_P$, $e_{S1}$ and $e_{S2}$ obtained through the wave vector composition method are substituting into the equation (5), the rotation matrix is built to transform the seismic wave of Z-component, R-component and T-component to get the pure P-wave, S1-wave and S2-wave.

When processing the data practically through the method, the seismic data may be divided into several time windows from shallow to deep, and in each time window, the vector separation of P-wave, S1-wave and S2-wave is performed, so as to achieve the wave field separation of the multi-layer fracture model.

Additionally, a numerical example is provided to verify the reliability of the above method. A schematic view of vectors of P-wave, S1-wave and S2-wave of the coordinate system at some certain time c is as shown in FIG. 4, the tilt angles θ of wave vectors P, S1 and S2 is an angle between the wave vector direction and the positive Z-axis, the azimuth angles thereof are the angles between the projection of the wave vector on the R-T plane and the positive direction of R-axis, and the modulis thereof are amplitude absolute values. The moduli of the wave vector P, S1 and S2 are 1, 0.9 and 0.85, separately. The tilt angle θ (the angle between wave vector and the positive Z-axis) is set to be 10°, 110° and 85°, respectively. The azimuth angle φ (the angle between the projection of the wave vector on the R-T plane and the positive R-axis) are set to be 50°, 145° and 55°, respectively. The dominate frequencies are at 50 HZ, 35 Hz and 30 Hz and the initial phases are at 30 ms, 60 ms and 100 ms, separately.

Figure 5A:
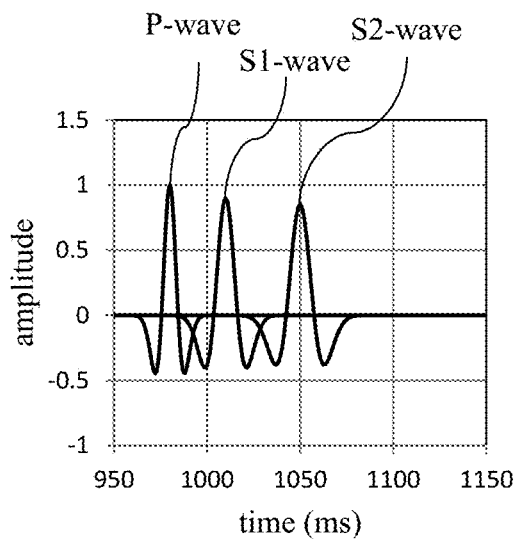
Figure 5B:
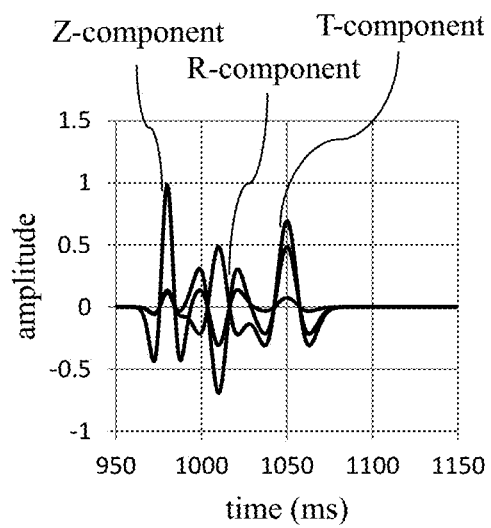
Figure 5C:
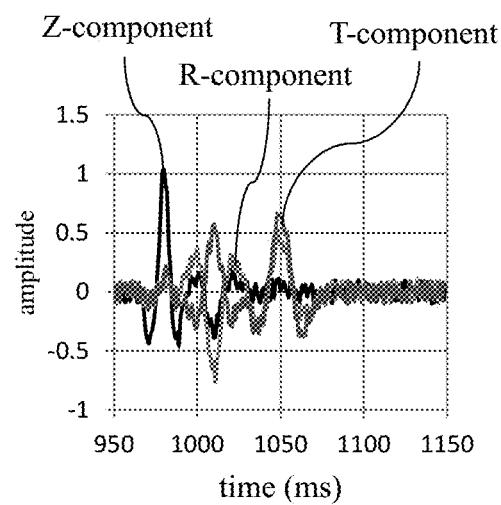
Figure 5E:
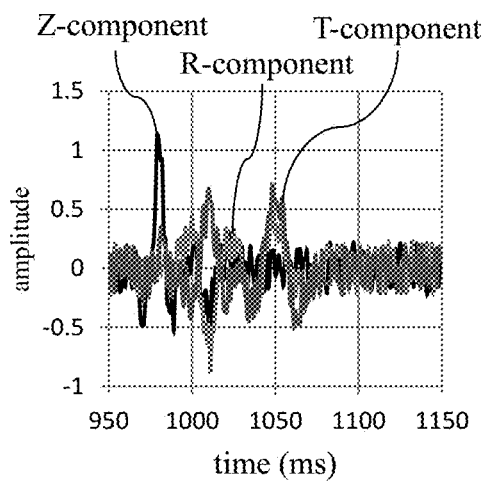
Figure 5:
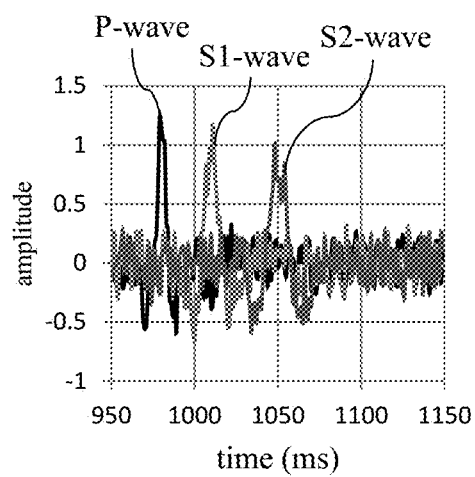
Figure 6A:
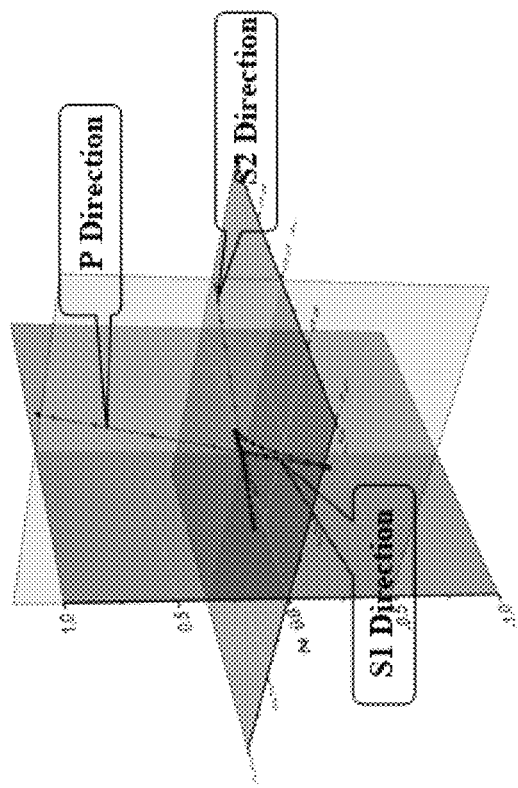
Figure 6B:
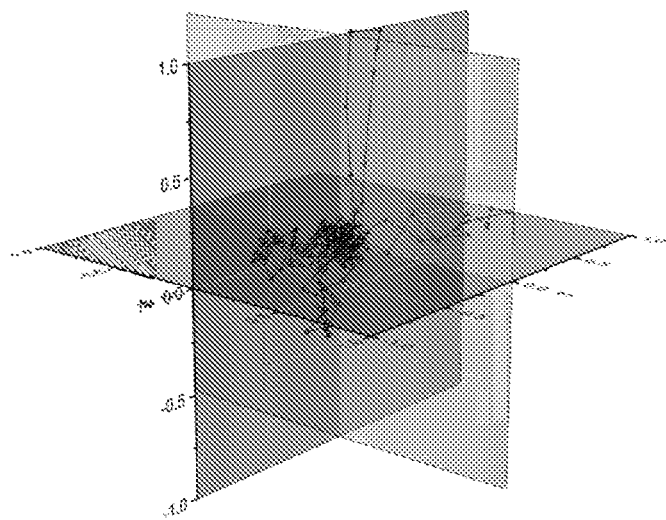
Figure 6C:
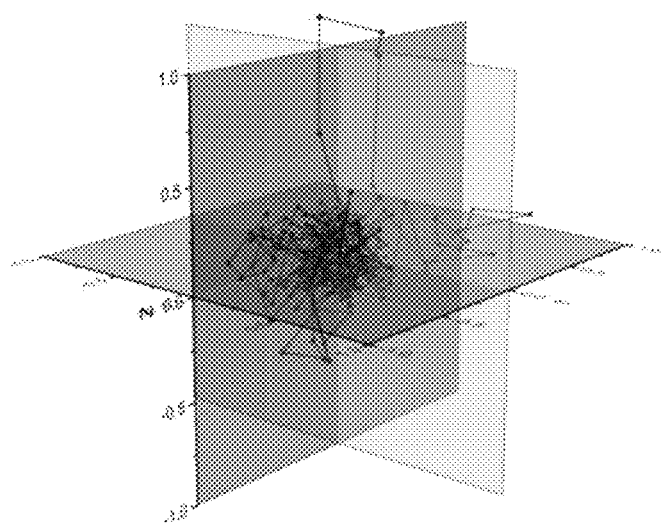

The synthetic records of pure P-wave, S1-wave and S2-wave are shown in FIG. 5(a), wherein the three wave fields are overlapped. The equation (4) is used to transform the pure three wave fields to a Cartesian coordinate system O-Z-R-T for deriving Z-component, R-component and T-component seismic data. As shown in FIG. 5(b), it should be seen that "the mode leakage" is serious. The Z-component, R-component and T-component simultaneously receive a part of the projection of the P-wave, S1-wave and S2-wave. In the absence of noise, the Z-component, R-component and T-component seismic data are projected as the particle trajectory curve as shown in FIG. 6(a). It can be seen that the wave vector directions are obvious to be recognized, although the three vector wave fields are overlapped on the Z-component, R-component and T-component record. 10% and 50% random noises are added to Z-component, R-component and T-component seismic data simultaneously, as shown in FIGS. 5(c) and 5(e), separately, and the schematic views of the corresponding particle trajectory curves thereof are shown in FIGS. 6(b) and 6(c), and it should be seen that the 10% random noise level has reduced the resolving power of the wave vector direction to a certain extent, but the wave vector directions of the three vector wave fields may be further determined. The 50% random noise level completely disrupts the normal wave vector directions and the particle trajectory curve is mixed and disorderly, thereby causing a great difficulty on the determination of the wave vector direction.

Figure 5D:
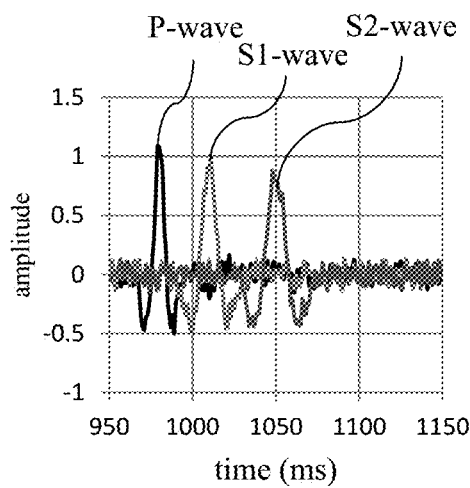

According to the above the wave vector composition method, the separation testing of the vector wave field is performed at the noise level of 10% and 50%, separately, and the results thereof are shown in FIGS. 5(d) and 5(f), it should be seen that in the situation of 10% noise level, P-wave, S1-wave and S2-wave are separated well and the wave phases matched with FIG. 5(a) well. Moreover, in the situation of 50% noise level, the wave field separation results P-wave, S1-wave and S2-wave are also satisfactory.

Figure 7A:
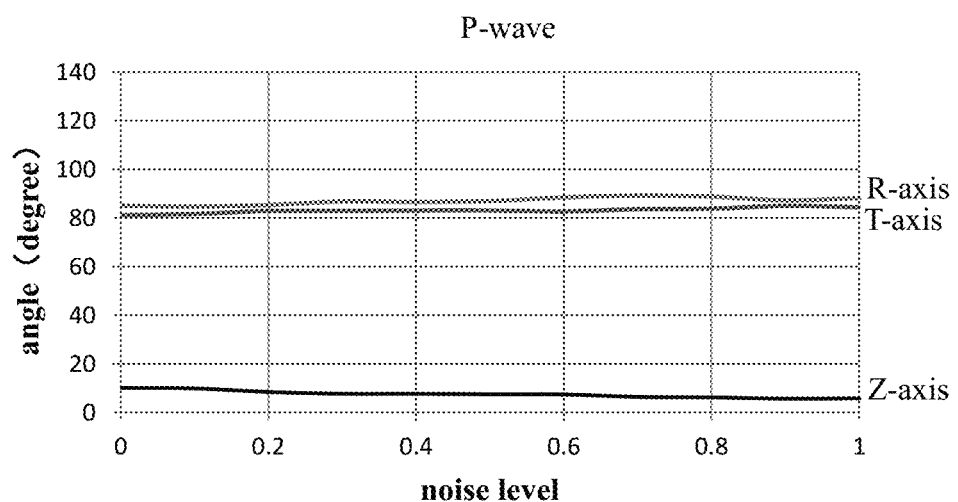
Figure 7B:
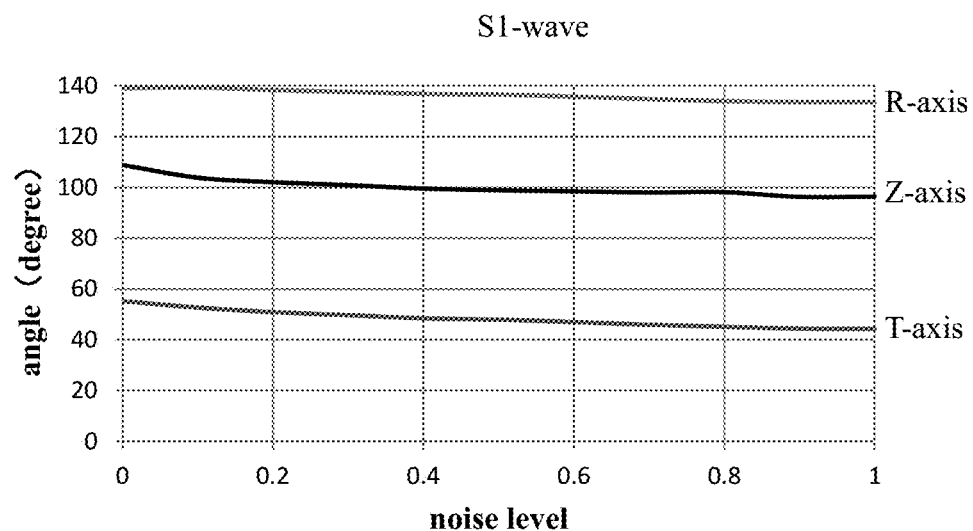
Figure 7C:
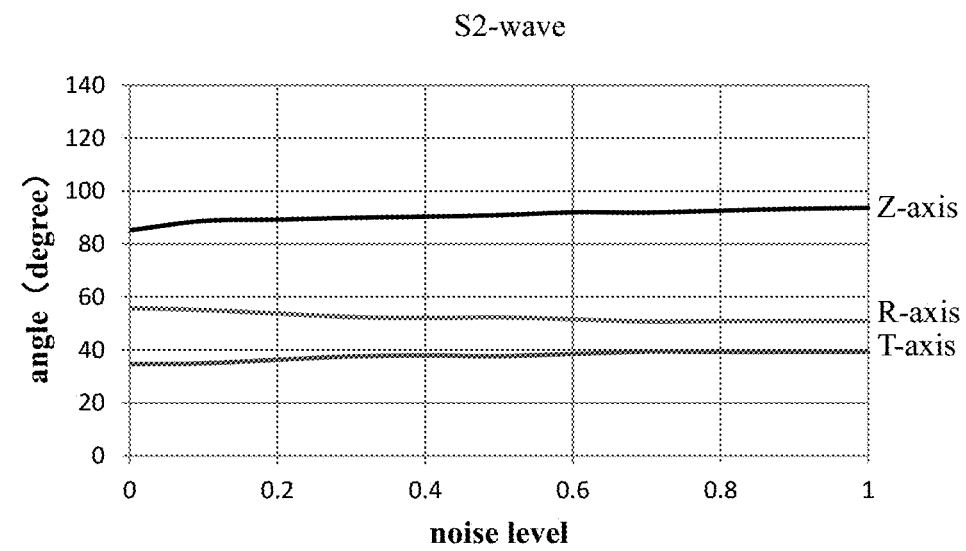

The angles between the wave vector and the positive R-axis and T-axis may be calculated as sin(θ)cos(φ) and sin(θ) sin(φ), respectively, through the tilt angle and the azimuth angle of the wave direction, the true angles between P-wave vector and the positive Z-axis, R-axis and T-axis are 10°, 84° and 82°, separately; the true angles between S1-wave vector and the positive Z-axis, R-axis and T-axis are 110°, 140° and 57°, separately; the true angles between S2-wave vector and the positive Z-axis, R-axis and T-axis are 85°, 55° and 350, separately. FIGS. 7(a), 7(b) and 7(c) are the angle curves between wave vector direction and the positive coordinate axis calculated at different noise levels, it should be seen that with the increase of the noise level, the angles between wave vector directions and the positive coordinate axis calculated by the wave vector composition method are closed to the true values, and no greater volatility occurs. This means that the wave vector composition method is stable for solving the wave vector direction, such that it may applied to the processing of the practical seismic data.

Figure 8A:
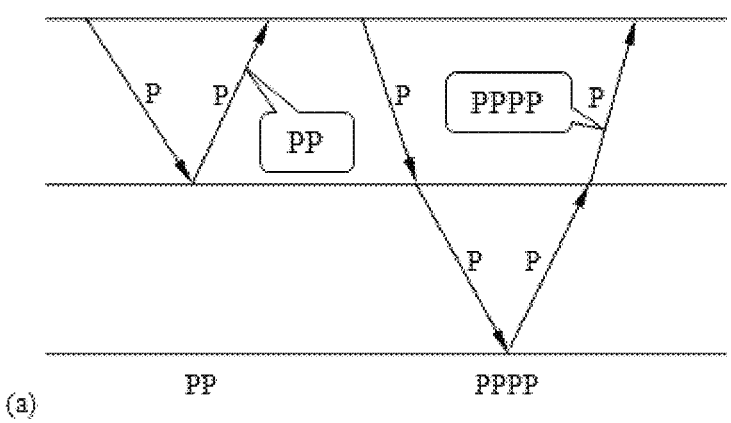
Figure 8B:
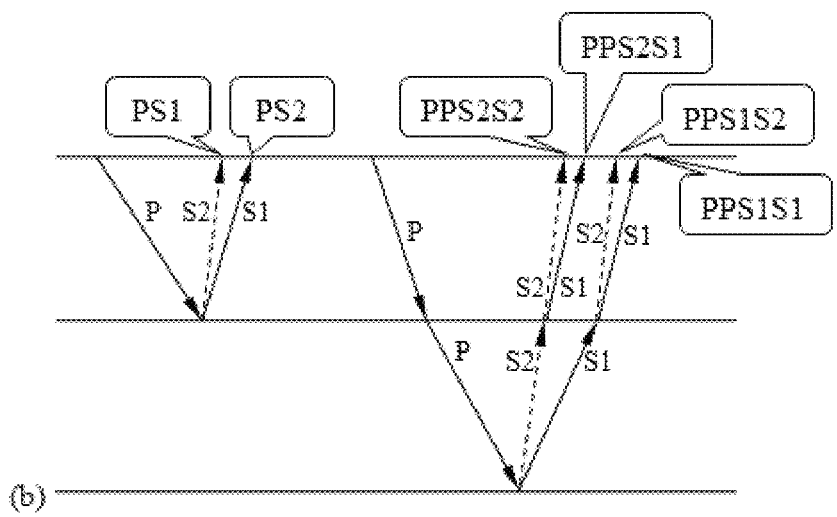
Figure 9A:
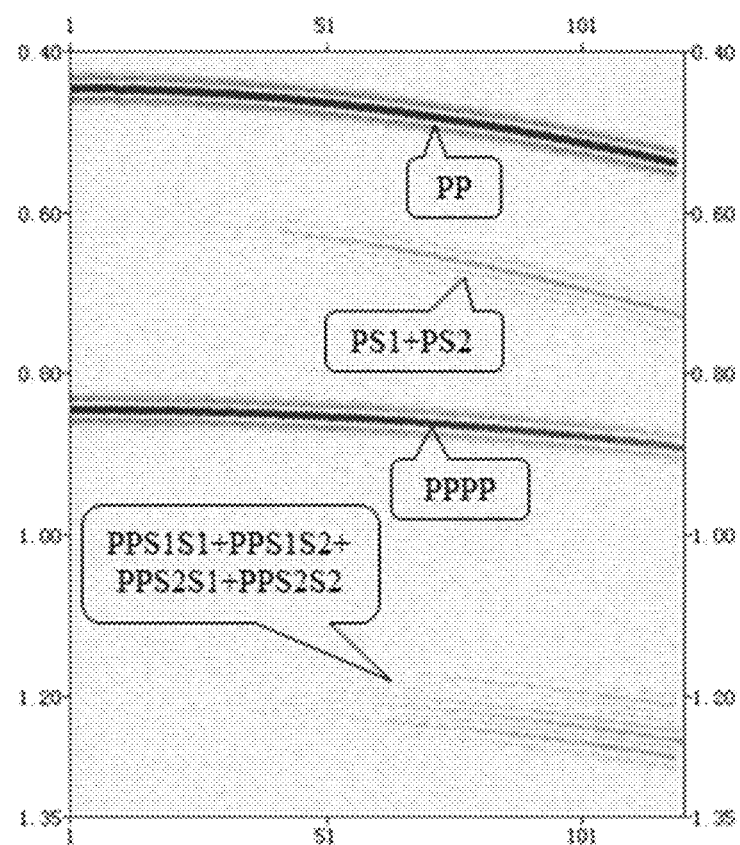
Figure 9B:
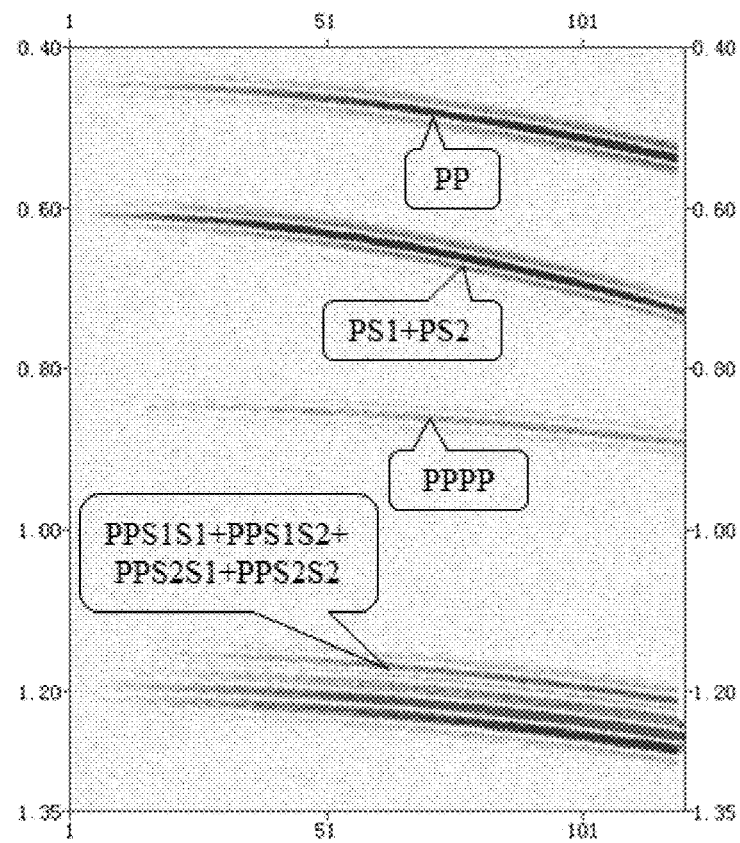
Figure 9C:
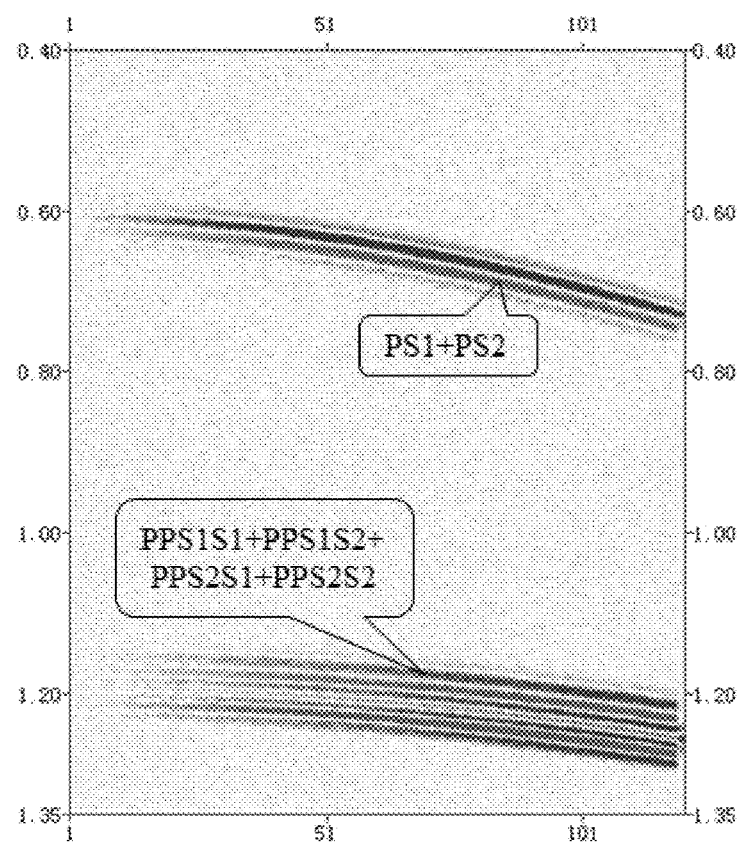

Then, a theoretical fracture model data shown in Table 1 is applied to perform a shooting ray-trace numerical simulation (Thomsen, 1995), the simulated wave filed modes are shown in FIGS. 8(a) and 8(b), and the corresponding synthetic 3-C records are shown in FIGS. 9(a), 9(b) and 9(c). The wave fields include PP, PPPP, PS1, PS2, PPS1S1, PPS1S2, PPS2S1 and PPS2S2. Because there are two strata with fractures, the reflected S wave from the second interface would have various shear wave splittings. The synthetic Z-component, R-component and T-component data are added with 40% random noise, separately, which are displayed in FIGS. 9(a), 9(b) and 9(c). The results of wave separation of P wave field, S1 wave field and S2 wave field with the time window at 200 ms, which are displayed in FIGS. 10(a), 10(b) and 10(c).

TABLE 1

| Theoretical fracture model parameters | | | | | | | |
|---|---|---|---|---|---|---|---|
| Density ($g/cm^3$) | Thickness (m) | Fracture azimuth (°) | P-wave velocity (m/s) | S-wave velocity (m/s) | ε | δ | γ |
| 2.0192 | 400 | 30 | 1800 | 1039.2 | 0.1 | 0.05 | 0.05 |
| 2.0731 | 400 | 45 | 2000 | 1154.7 | 0.12 | 0.06 | 0.12 |
| 2.1231 | 400 | 0 | 2200 | 1270.2 | 0 | 0 | 0 |

Figure 10B:
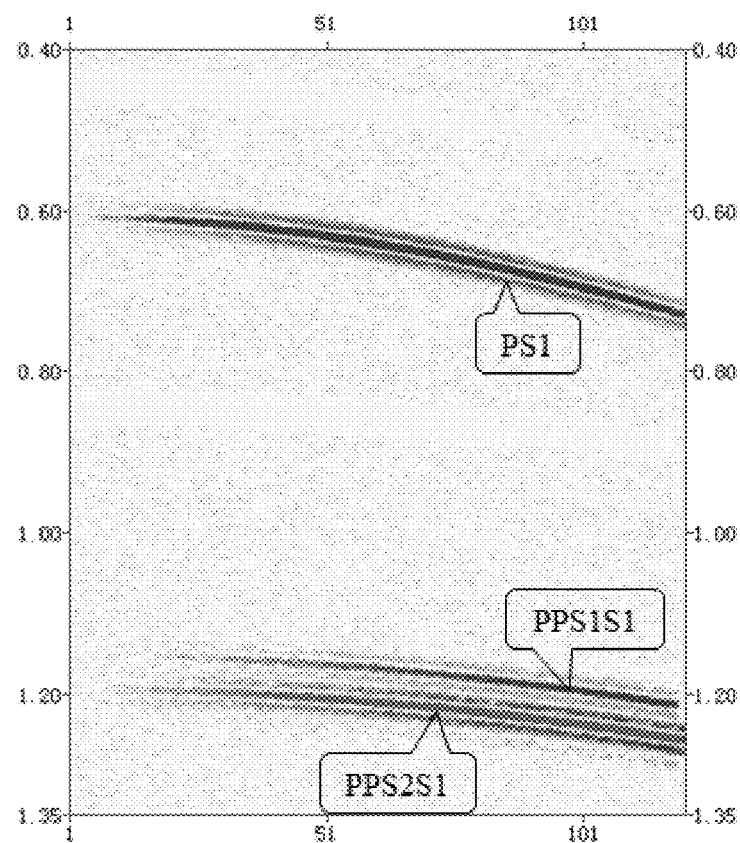
Figure 10C:
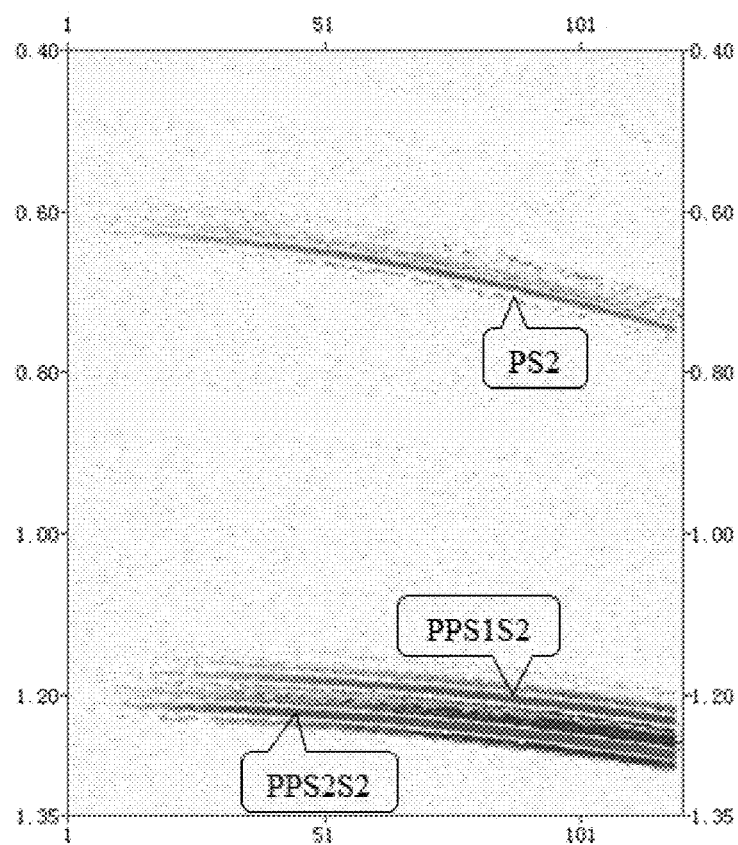

According to the above content, it should be seen that: the wave fields of P-wave on the Z-component and the wave fields of P-wave of R-component are separated, as shown in FIG. 9a. It may be further seen that after the reflected S-wave of the first interface splits into PS1 and PS2, the results of wave filed separation are better although the time difference between the both is small, as shown in FIGS. 10(b) and 10(c). Furthermore, the split S wave of the second interface are separated into PPS1S1 and PPS2S1 shown in FIG. 10(b) and PPS1S2 and PPS2S2 shown in FIG. 10(c). Therefore, the separation result of the shot data is good even in the noisy situation.

In summary, in the present disclosure, by way of conducing no orthogonal polarization on the anisotropic wavefield, the seismic wave projected on Z-component, R-component and T-component of Z-R-T coordinate system are transformed to the true wave vector directions of pure P-wave, S1-wave and S2-wave, so as to facilitate the subsequent true amplitude imaging and inversion, thereby solving a problem of the error of the prediction result of the fracture parameters caused by the "mode leakage" phenomenon.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A prestack separating method for a seismic wave to determine true wave vector directions comprising:

receiving, by a three-component receiver, at a surface above a multi-layer underground medium, at a certain time window, a P-wave, a S1-wave and a S2-wave of the seismic wave, wherein the P-wave was reflected from a first interface of the multi-layer underground medium, the S1-wave and the S2-wave were reflected from a second interface of the multi-layer underground medium, wherein the first interface is deeper than the second interface relative to the surface projecting, by the three-component receiver, the P-wave, the S1-wave and the S2-wave into a Z-R-T coordinate system, such that all the projections appear on the three-component receiver at the surface, wherein the Z-R-T coordinate system comprises a Z coordinate, a R coordinate, and a T coordinate, wherein projecting the P-wave, the S1-wave, and the S2-wave into the Z-R-T coordinate system generates a projection matrix, wherein the Z coordinate is a vertical component, the R coordinate is a component of a source-to-receiver azimuth and the T coordinate is a component orthogonal to a direction of the R coordinate, and wherein the projection matrix satisfies equation:

$$\begin{bmatrix} P \\ S1 \\ S2 \end{bmatrix} = \begin{bmatrix} P_Z & P_R & P_T \\ S1_Z & S1_R & S1_T \\ S2_Z & S2_R & S2_T \end{bmatrix} \begin{bmatrix} e_Z \\ e_R \\ e_T \end{bmatrix}$$

wherein P is a vector of the P-wave, S1 is a vector of the S1-wave, and S2 is a vector of the S2-wave, $e_Z$ is a base vector of a direction of the Z coordinate, $e_R$ is a base vector of the direction of the R coordinate, and $e_T$ is a base vector of a direction of the T coordinate, $P_Z$ is an amplitude of the P-wave on the Z coordinate, $S1_Z$ is an amplitude of the S1-wave on the Z coordinate, and $S2_Z$ is an amplitude of the S2-wave on the Z coordinate, $P_R$ is an amplitude of the P-wave on the R coordinate, $S1_R$ is an amplitude of the S1-wave on the R coordinate, $S2_R$ is an amplitude of the S2-wave on the R coordinate, $P_T$ is an amplitude of the P-wave on the T coordinate, $S1_T$ is an amplitude of the S1-wave on the T coordinate, and $S2_T$ is an amplitude of the S2-wave on the T coordinate;

forming, by the three-component receiver, a composite vector from the P vector, the S1 vector, and the S2 vector, wherein the composite vector satisfies equation:

$A$(composite)=$Z$(composite)+$R$(composite)+$T$(composite), wherein A(composite) is the composite vector, Z(composite) is a vector of the composite vector in the direction of the Z coordinate, R(composite) is a vector of the composite vector in the direction of the R coordinate, and T(composite) is a vector of the composite vector in the direction of the T coordinate wherein Z(composite), R(composite) and T(composite) satisfy equation:

$$\begin{cases} Z(\text{composite}) = (P_Z + S1_Z + S2_Z)e_Z \\ R(\text{composite}) = (P_R + S1_R + S2_R)e_R \\ T(\text{composite}) = (P_T + S1_T + S2_T)e_T \end{cases}$$

transforming, by the three-component receiver, the composite vector to an anisotropic wave vector matrix, comprising an anisotropic wave, wherein the anisotropic wave vector matrix satisfies equation:

$$\begin{bmatrix} Z(\text{composite}) \\ R(\text{composite}) \\ T(\text{composite}) \end{bmatrix} = \begin{bmatrix} \cos(e_P, e_Z) & \cos(e_{S1}, e_Z) & \cos(e_{S2}, e_Z) \\ \cos(e_P, e_R) & \cos(e_{S1}, e_R) & \cos(e_{S2}, e_R) \\ \cos(e_P, e_T) & \cos(e_{S1}, e_T) & \cos(e_{S2}, e_T) \end{bmatrix} \begin{bmatrix} P \\ S1 \\ S2 \end{bmatrix},$$

wherein $e_P$ is a base vector of the P-wave, $e_{S1}$ vector is a base vector of the S1-wave, and $e_{S2}$ vector is a base vector of the S2-wave, wherein $\cos(e_P, e_Z)$ is a cosine of an angle between the $e_P$ vector and the $e_Z$ vector, $\cos(e_P, e_R)$ is a cosine of an angle between the $e_P$ vector and the $e_R$ vector, $\cos(e_P, e_T)$ is a cosine of an angle between the $e_P$ vector and the $e_T$ vector, $\cos(e_{S1}, e_Z)$ is a cosine of an angle between the $e_{S1}$ vector and the $e_Z$ vector, $\cos(e_{S1}, e_R)$ is a cosine of an angle between the $e_{S1}$ vector and the $e_R$ vector, $\cos(e_{S1}, e_T)$ is a cosine of an angle between the $e_{S1}$ vector and the $e_T$ vector, $\cos(e_{S2}, e_Z)$ is a cosine of an angle between the $e_{S2}$ vector and the $e_Z$ vector, $\cos(e_{S2}, e_R)$ is a cosine of an angle between the $e_{S2}$ vector and the $e_R$ vector, and $\cos(e_{S2}, e_T)$ is a cosine of an angle between the $e_{S2}$ vector and the $e_T$ vector; and performing, by the three-component receiver, a rotation transformation of an affine coordinate system on the anisotropic wave vector matrix to generate a wave separation matrix, wherein the wave separation matrix satisfies equation:

$$\begin{bmatrix} P(\text{pure}) \\ S1(\text{pure}) \\ S2(\text{pure}) \end{bmatrix} = \begin{bmatrix} \cos(e_P, e_Z) & \cos(e_{S1}, e_Z) & \cos(e_{S2}, e_Z) \\ \cos(e_P, e_R) & \cos(e_{S1}, e_R) & \cos(e_{S2}, e_R) \\ \cos(e_P, e_T) & \cos(e_{S1}, e_T) & \cos(e_{S2}, e_T) \end{bmatrix}^{-1} \begin{bmatrix} Z(\text{composite}) \\ R(\text{composite}) \\ T(\text{composite}) \end{bmatrix}$$

wherein P(pure) is a vector of the P-wave of the seismic wave, S1(pure) is a vector of the S1-wave of the seismic wave, and S2(pure) is a vector of the S2-wave of the seismic wave, wherein directions of the P(pure) vector, the S1(pure) vector, and the S2(pure) vector are the true wave vector directions, wherein the true wave vector directions of the S1-wave of the seismic wave and the S2-wave of the seismic wave are separated from the true wave direction of the P-wave of the seismic wave, and wherein the true wave vector directions of the S1-wave of the seismic wave and the S2-wave of the seismic wave are utilized to predict fracture parameters of the multi-layer underground medium.

\* \* \* \* \*